UNITED STATES PATENT OFFICE.

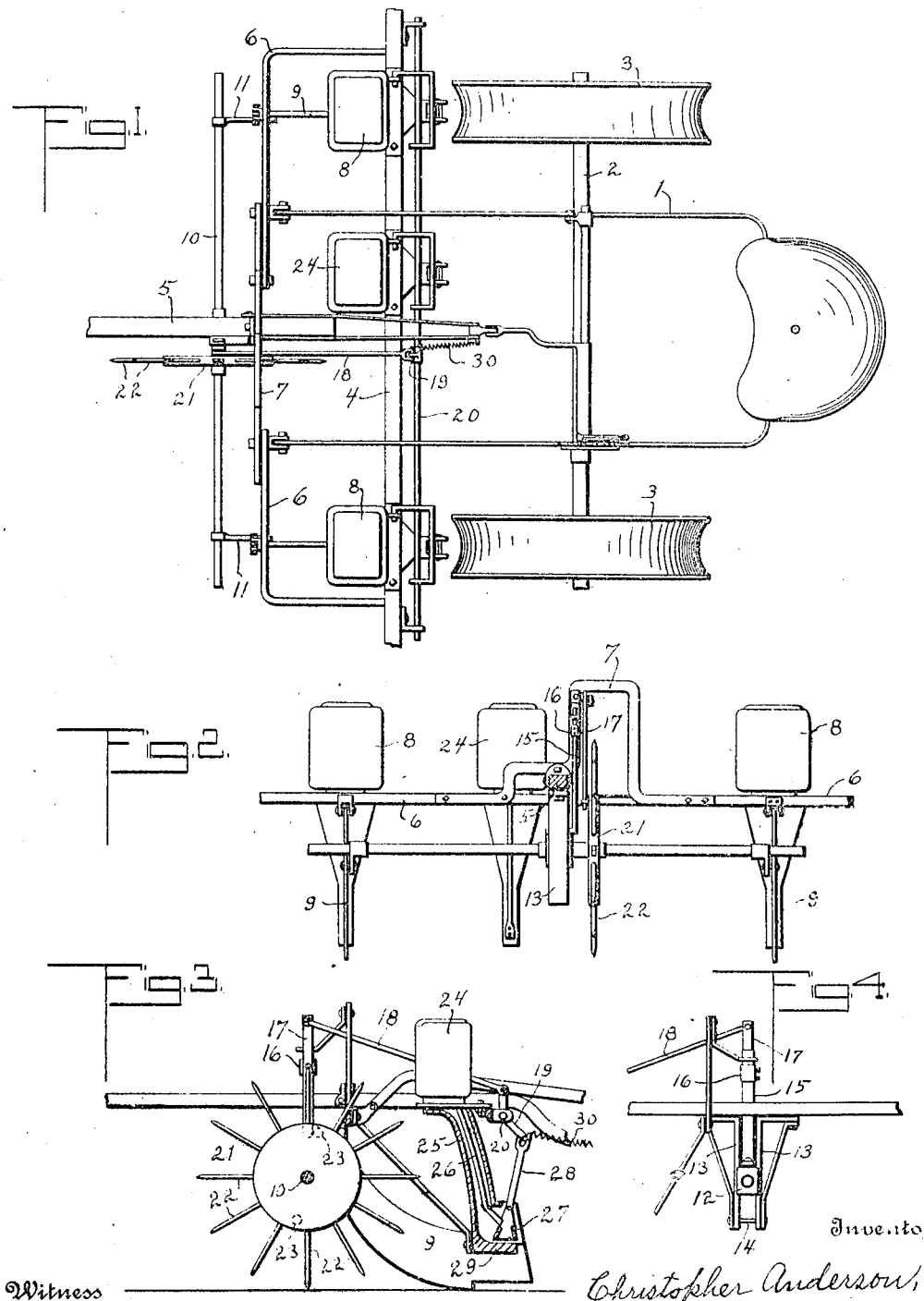

CHRISTOPHER ANDERSON, OF ROCK ISLAND, ILLINOIS.

MARKING DEVICE FOR CORN-PLANTERS.

1,286,196.      Specification of Letters Patent.      Patented Dec. 3, 1918.

Application filed December 21, 1917. Serial No. 208,332.

*To all whom it may concern:*

Be it known that I, CHRISTOPHER ANDERSON, a citizen of the United States, residing at Rock Island, in the county of Rock Island and State of Illinois, have invented certain new and useful Improvements in Marking Devices for Corn-Planters, of which the following is a specification.

My invention pertains to marking-devices for corn planters, and has special reference to improved means for indicating the alinement of the successive rows of plantings, so that the alinement of the hills of corn may be maintained transversely of the longitudinal rows, so that the young grain can be readily cultivated either longitudinally of said rows or at right-angles thereto.

The chief purpose of my device is to do away with the use of the check-row wires by which it is customary to operate the dropping mechanism of a planter, and this is accomplished by means of a supply of white sand carried on the machine in a suitable receptacle, a small quantity of which sand is deposited on the ground coincidently with the discharge of the seed from the seed hoppers, and in line with the hills of corn which are formed by such discharge.

My invention is an improvement on a similar machine shown and described in Letters Patent of the United States No. 877,693, issued to myself on the twenty-eighth day of January, 1908, and especially designed for use therewith, but is not limited thereto, as it can be readily adapted for use with any planter of the type shown.

In the drawings, Figure 1 is a plan view of a corn planter, with my invention embodied therein. Fig. 2 is a front view of the discharge devices of such machine, detached. Fig. 3 is a side view of my invention, with some of the parts in vertical section. Fig. 4 is a detail of the devices for supporting shaft frame and parts thereon.

1 represents the frame of a corn planter of usual construction, supported on a shaft 2 and carrying wheels 3 on the ends thereof. 4 is an auxiliary frame carried by said main frame, and provided with a tongue 5. The front bar 6 of the frame 4 is cut away and the parts united by an arch member 7. Supported in the frame 4 are seed receptacles 8 and furrow openers 9, to the forward ends of which is connected a rotary shaft 10 by means of arms 11, which have a pivotal connection with the furrow openers so as to permit a limited up and down movement of the shaft 10. The shaft 10 is supported at a central point in a boxing 12 slidable vertically in brackets 13 secured to the lower face of the tongue 5. Such boxing can be held rigidly in place by means of a bolt 14 connecting the lower ends of said bracket. On the upper face of the boxing 12 is secured a standard 15 on which is slidable a sleeve 16 adapted to be rigidly connected with the standard by means of set screws. Fulcrumed on the sleeve 16 is a lever 17 connected by a rod 18 with a lever 19 fulcrumed in rear of the frame 4 on a rock-shaft 20. Mounted on the shaft 10 is a wheel 21 provided with a plurality of radial spikes 22, which enter the ground at the lower side of the wheel upon the forward movement of the machine, and cause such wheel to rotate. One of the faces of the wheel 21 is provided with a pair of pins 23, which are adapted to successively engage the lower end of the lever 17 and impart thereto a swinging movement upon the wheel being rotated.

On the frame 4 is mounted an auxiliary receptacle 24 provided with a chute 25 within which is a tube 26 communicating with the hopper 24. The lower end of said tube opens into the foot 27 of a lever 28 fulcrumed in said chute and connected at its upper end with the lever 19. The receptacle 24 is intended to be provided with a quantity of dry, white, sand, which will flow freely through the tube 26 into the foot 27, which is open at its lower end, and normally closed by a shelf 29 at the lower end of the chute 25. The swinging movement of the lever 17 hereinbefore referred to is imparted to the rock-shaft 20 through the rod 18 and upper arm of the lever 19, giving to said shaft a partial rotation and also moving the lower end of the lever 19 forwardly and the lower end of the lever 28 rearwardly. This movement carries the foot 27 past the edge of the shelf 29, discharging a small quantity of the sand contained therein and depositing it upon the ground, in elongated shape about the size of an egg. The quantity or pile of sand thus deposited can be discerned for a considerable distance.

The dropping mechanism for the seed boxes 8 is also connected with the rock-shaft 20, in the usual manner, so that the same is operated by the action of the lever 17 and simultaneously with the movement of the lever 28 to cause the discharge of the small quantity of sand. This results in the sand marker being located between the two hills of corn deposited by the hoppers 8, and in line therewith. As the rows of hills are multiplied as the planting progresses, the piles of sand will be visible in rows transversely of the line of movement of the machine and one-half in number of the hills of corn in the transverse rows. So long as the piles of sand are in alinement the hills of corn will be similarly located. It will be possible for the operator of the machine to determine at a glance whether or not such markers are in line, and if they are getting out of line to elevate the seed devices from the ground so that the wheel 21 can be turned by hand to make such adjustments as may be necessary to cause the seed devices and marking devices to again operate in alinement with the rows already planted.

It will be obvious that one rotation of the wheel 21 will cause two operations of the seeding and marking devices, and the relations of the parts are such that such operations will normally be spaced so that the discharge of the seed and sand will succeed each other at the usual distances upon the ground, which is normally thirty-six inches in corn planting. By setting the sleeve 16 at a higher point on the standard 15 the lever 17 is correspondingly raised, so that the contact of the pin 23 against the lower end of said lever will be for a shorter space of time. This will result in an increase spacing of the discharge movements so as to increase the distances between the successive plantings and markings an inch or two as desired. The same result can be attained by raising the boxing 12 and supporting the same at a higher point in the brackets 13 or providing the pins 23 with rollers of greater diameters than the pins themselves. The spacing of the rows can be similarly reduced by lowering the fulcrum point of the lever 17, or decreasing the size of the pins 23.

When the rock-shaft 20 has been actuated by a movement of the lever 17, such rock-shaft and the parts connected therewith are returned to their former positions by means of a coiled spring 30 connecting the lower end of the lever 19 with the frame.

When in operative position, the wheel 21 is held at such a height from the ground that at least three of the spikes 22 will be in engagement with the earth at all times.

What I claim as my invention, is:

1. In a device of the class described, the combination of a portable frame; an auxiliary frame connected therewith and provided with a central arched section; a wheel rotatably mounted in said arched section, provided on one of its faces with a pair of pins, and having radial earth-engaging spikes; a lever-support mounted in proximity to said wheel, and capable of vertical adjustment; a lever fulcrumed on said support, and adapted to be engaged successively by said pins; a receptacle mounted on said auxiliary frame, adapted to hold a quantity of light-colored granulated material; discharge devices associated with said receptacle, to permit the release of the contents thereof in desired quantities; and means for operatively connecting said discharge devices with said lever.

2. In a device of the class described, the combination of a portable frame; an auxiliary frame connected therewith and provided with a central arch; a receptacle mounted on said auxiliary frame, adapted to hold a supply of light-colored granulated material, and provided with a suitable outlet; a lever provided with a hollow shoe adapted to receive a quantity of said material and discharge the same upon the ground; a rock-shaft operatively connected with said lever, to suitably actuate the same; and a wheel, rotatably mounted in said arch; provided with earth-engaging spikes, and operatively connected with said rock-shaft.

In testimony whereof I affix my signature.

CHRISTOPHER ANDERSON.

Copies of this patent may be obtained for five cents each, by addressing the "Commissioner of Patents, Washington, D. C."